W. J. HOTCHKISS.
GASOLENE SUPPLY RESERVOIR FOR MOTOR VEHICLES.
APPLICATION FILED NOV. 18, 1914.
1,168,636.
Patented Jan. 18, 1916.
2 SHEETS—SHEET 1.
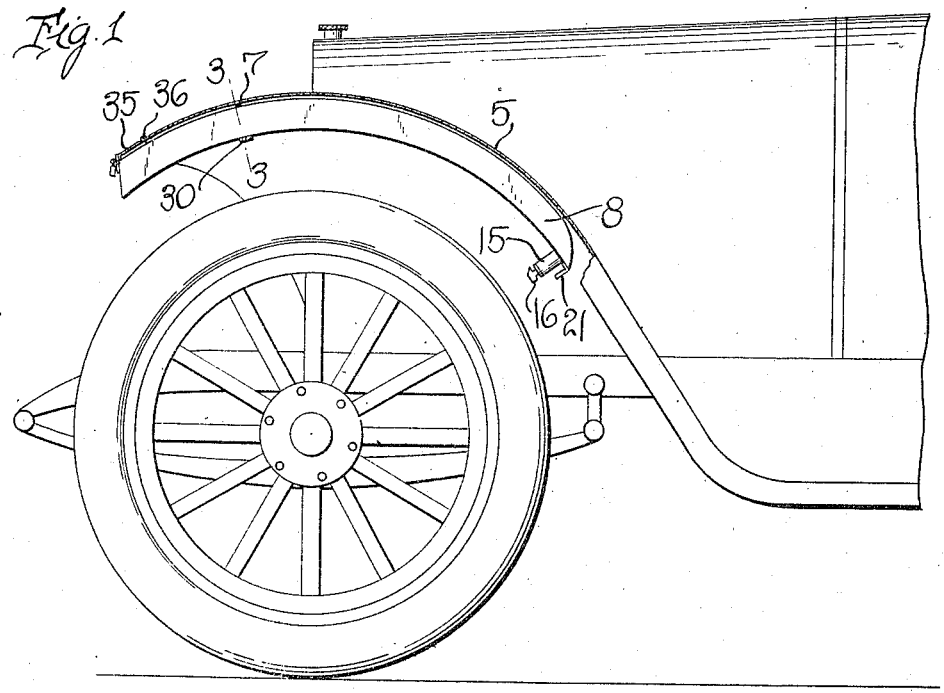
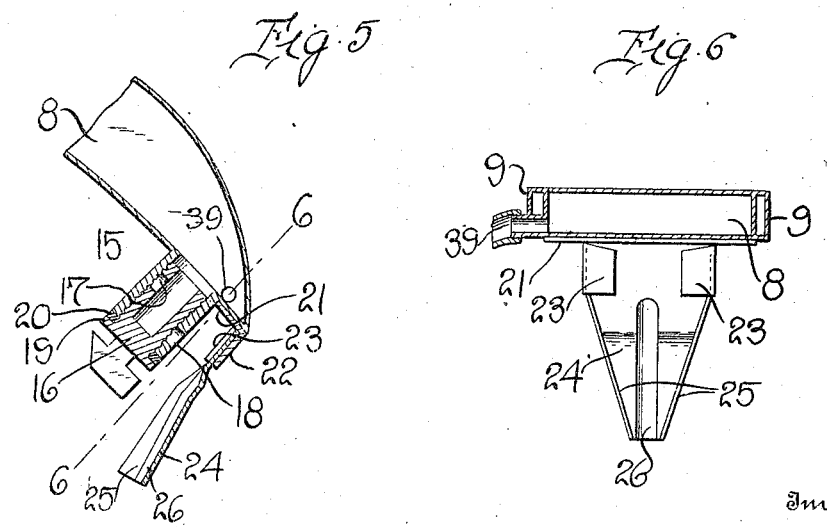
Witnesses
Robert M. Sutphen
A. J. Hind
Inventor
W. J. HOTCHKISS
By Watson E. Coleman
Attorney W. J. HOTCHKISS.
GASOLENE SUPPLY RESERVOIR FOR MOTOR VEHICLES.
APPLICATION FILED NOV. 18, 1914.
1,168,636.
Patented Jan. 18, 1916.
2 SHEETS—SHEET 2.
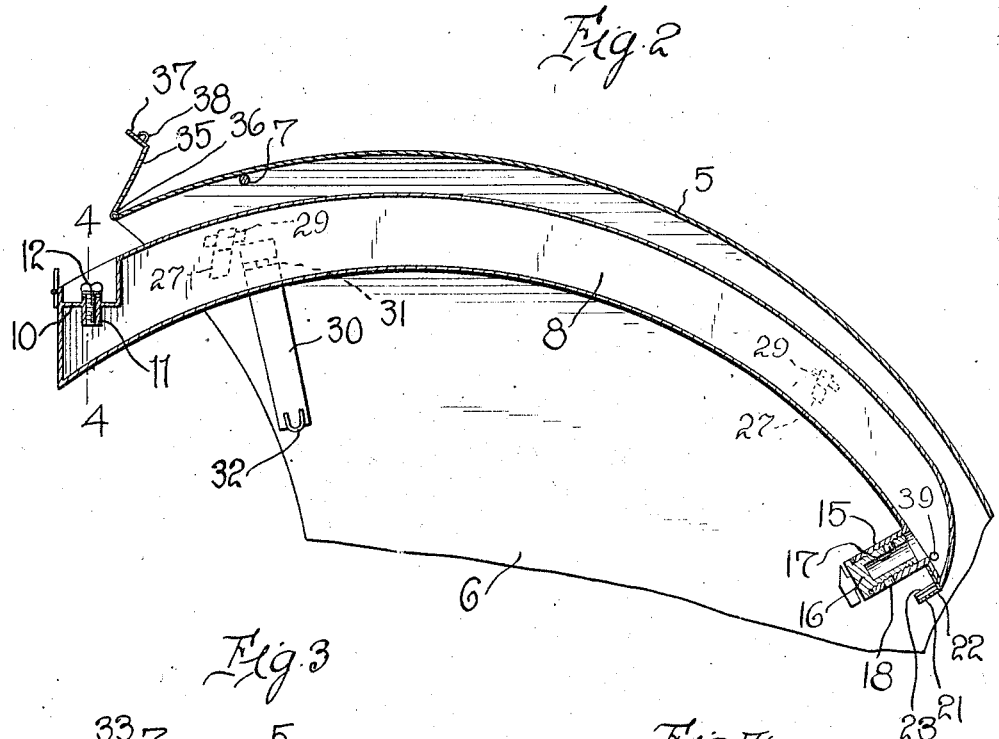
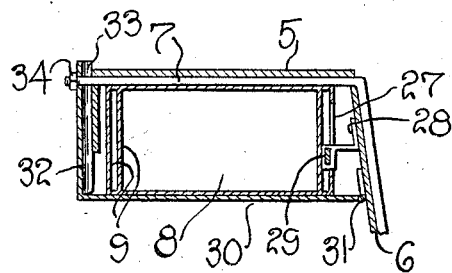
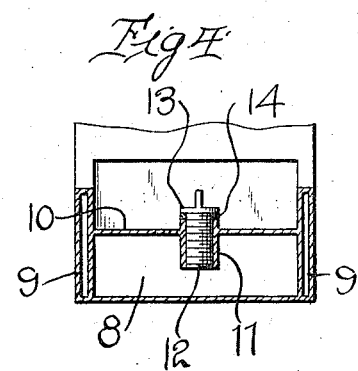
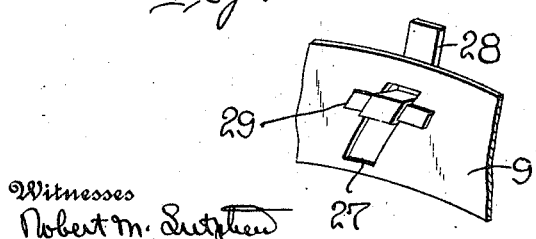
Witnesses
Robert M. Sutphen
A. I. Hind
Inventor
W. J. HOTCHKISS
By Watson E. Coleman
Attorney

UNITED STATES PATENT OFFICE.

WALLACE J. HOTCHKISS, OF ALPENA, SOUTH DAKOTA.

GASOLENE-SUPPLY RESERVOIR FOR MOTOR-VEHICLES.

1,168,636. Specification of Letters Patent. Patented Jan. 18, 1916.

Application filed November 18, 1914. Serial No. 872,871.

*To all whom it may concern:*

Be it known that I, WALLACE J. HOTCHKISS, a citizen of the United States, residing at Alpena, in the county of Jerauld and State of South Dakota, have invented certain new and useful Improvements in Gasolene-Supply Reservoirs for Motor-Vehicles, of which the following is a specification, reference being had to the accompanying drawings.

This invention relates to certain improvements in gasolene supply reservoirs for motor vehicles and, generically stated, has for its principal object to provide a convenient arrangement and mounting of one or more gasolene tanks or reservoirs upon the body of the vehicle so that a large supply of fuel may be carried and, owing to the location of the reservoir with respect to the engine, liability of explosion of the fuel supply is practically eliminated.

Considered in its more specific aspect, my present invention provides an improved reservoir construction and mounting arranged upon the under side of the wheel guard of the machine whereby the reservoir may be easily and quickly filled or supplied with gasolene, and the reservoir itself practically entirely hidden from view so that the same will not detract from the appearance of the car or vehicle.

It is a further object of my invention to provide a device of the above character having the advantageous features noted, which may be readily applied to the ordinary motor vehicle as at present constructed, and may also be manufactured at comparatively small cost.

With the above and other objects in view, my invention consists in the novel features of construction, combination, and arrangement of parts to be hereinafter more fully described, claimed, and illustrated in the accompanying drawings, in which, Figure 1 is a side elevation of the forward end of the motor vehicle, the mud guard being shown in section and having my invention applied thereto; Fig. 2 is a longitudinal section showing the reservoir in its lowered position to be filled; Fig. 3 is a section taken on the line 3—3 of Fig. 1; Fig. 4 is a section taken on the line 4—4 of Fig. 2; Fig. 5 is an enlarged vertical section through the rear end of the reservoir illustrating the manner of draining the gasolene therefrom; Fig. 6 is a section taken on the line 6—6 of Fig. 5; and Fig. 7 is a detail fragmentary perspective view illustrating the manner of mounting the reservoir upon the flange of the mud guard.

Referring in detail to the drawings, 5 designates a mud guard such as is usually provided upon the ordinary motor vehicle to extend over the top of the vehicle wheel. This guard includes the inner depending flange or wall 6 by means of which the guard is secured to the body of the vehicle by suitable bolts indicated at 7.

In the preferred embodiment of my invention, I provide a reservoir generally designated by the numeral 8. This reservoir is approximately of the same curvature as the mud guard 5 and is preferably constructed of sheet metal. The reservoir has double longitudinal side walls 9, whereby a longitudinally extending air space or chamber is formed upon each side of the reservoir. It is to be noted that the reservoir tapers or is gradually reduced in depth toward its rear end. At the forward end of the reservoir, the same is provided with a top section indicated at 10, which is disposed below the upper edge of the side walls. The filling pipe or tube 11 is centrally fixed in this wall section 10 and is adapted to be closed by a plug 12 which is threaded therein. This plug has a flange 13 formed upon its other end upon the under side of which a washer 14 of rubber or other suitable material is secured so as to provide a fluid tight connection between said plug and the upper end of the tube 11.

In the bottom wall of the reservoir at its rear end, a drainage tube 15 is fixed, said tube being interiorly threaded to receive a hollow closure plug 16. It will be noted that the wall of this plug is provided with an opening 17, and this opening is adapted to coincide with a similar opening 18 in the wall of the tube 15 whereby the contents of the reservoir are permitted to escape or drain therefrom. The lower end of the plug 16 is also provided with an annular flange 19 upon which the washer 20 is secured. When the plug is threaded into the tube 15, the opening in the wall of said plug is disposed out of registration with the opening in the wall of the tube 15 whereby the escape of the contents of the reservoir is prevented. Upon the rear end of the reservoir a bracket plate 21 is secured, said plate having a depending flange 22 provided upon its opposite ends with inturned lugs or ears 23 which form guides between which one end of a directing member or funnel 24 is adapted to be engaged. This funnel member is formed from a single sheet of metal which tapers longitudinally and is provided upon its opposite edges with flanges 25 and a central longitudinally extending groove 26. When the closure plug in the tube 15 is threaded outwardly to aline the openings 17 and 18, the gasolene in the reservoir will escape through said openings into the funnel member, from which the gasolene is directed into a suitable receptacle arranged beneath the same. After the reservoir has thus been drained of its contents, the funnel member is detached or removed from the bracket 21.

The outer sheet metal plate of one of the double side walls of the reservoir is provided adjacent to its outer end with the curved or arcuate slots 27. Upon the depending flange 6 of the mud guard, the lugs 28 are secured. These lugs project through the slots 27 and in each lug a locking plate or key 29 is secured. The guide lugs are, of course, first mounted in the wall of the reservoir and then secured to the mud guard. It is thus apparent that the reservoir is mounted to have a limited vertical movement with respect to the mud guard. In order to prevent such movement and securely hold said reservoir in a raised position against the under side of the guard, I provide one or more brackets each of which includes a plate 30 hinged at one of its ends as shown at 31, to the lower edge of the flange 6 of the mud guard. This plate extends beneath the reservoir and outwardly and has formed upon its outer end a semi-cylindrical arm or extension 32 which projects at right angles to the plane of the plate 30. This arm is provided adjacent to its extremity with an opening indicated at 33 for the purpose of receiving one of the bolts 7 whereby the mud guard is fastened upon the body of the vehicle. A nut 34 is, of course, threaded upon the end of the bolt to hold the bracket member in connection therewith. One of these brackets, arranged adjacent the forward end of the reservoir, will usually be found sufficient to properly support the reservoir in position against the under side of the mud guard, although, if desired, two or more of the supporting brackets may be employed.

It will be observed that the forward end of the reservoir projects in advance of the end of the mud guard, whereby access to the filling nozzle may be readily obtained. The plug or closure of this nozzle, when the same is in place, is disposed below the plane of the top body wall of the reservoir, and upon the forward end of the mud guard a cover plate 35 is hinged as at 36, said plate being formed with a flange 37 which is adapted to rest within the forward end wall of the reservoir. This flange is preferably provided with a staple 38 to receive a hasp on the reservoir and is designed to receive the shackle of a padlock, whereby access to the filling nozzle may be prevented. In this manner, the owner of the automobile may prevent the use of the machine by thus rendering it impossible to supply the reservoir with gasolene or other fuel. A supply tube or conduit 39 is connected to the interior of the reservoir at its rear end through one of the side walls thereof, to supply the fuel to the carbureter of the engine.

From the foregoing description, taken in connection with the accompanying drawings, the construction and manner of operation of the device will be readily understood. When it is desired to fill the reservoir, the bracket member is disconnected from the bolt 7 and allowed to hang downwardly below the mud guard. The reservoir will then drop or fall to a point below the guard, the extent of such movement being determined by the length of the slots 27 in the side walls of the reservoir. The forward end of the reservoir is then lowered into convenient position to enable the same to be filled through the tube or pipe from which the closure plug has been removed. In view of the fact that this forward end of the reservoir curves downwardly, as the gasolene is poured into the same, the reservoir must be raised so that the gasolene will flow backwardly into the rear end thereof. After the reservoir has been filled and the filling tube closed, the same is held against the under side of the mud guard and the bracket member again arranged in position, the plate 30 being engaged upon the under side of the reservoir and directly supporting the same. When the nut 34 has been threaded inwardly upon the bolt 7 to engage the upstanding arm of the bracket member, said member will be securely held in position and the reservoir properly supported to prevent movement thereof with relation to the mud guard.

From the foregoing, it will be seen that I have produced a very simply constructed, highly serviceable, and desirable reservoir construction and mounting for motor vehicles whereby a large supply of gasolene may be carried on the car. The several parts of the device are all of a simple form and may, therefore, be produced at comparatively small manufacturing cost. It is also to be observed that in the application of my invention, no material alterations are required in the construction of the vehicle. By arranging the reservoir under the guard the same is inconspicuous and will not, therefore, detract from the appearance of the vehicle. It is, of course, manifest that the reservoir may be constructed in various shapes to conform with the particular shape of the mud guard which may be provided upon the vehicle. The reservoir can also be constructed in any desired length and of any capacity.

While I have above described the preferred construction and arrangement of the several elements employed, it is to be understood that the device is susceptible of considerable modification therein, and I therefore reserve the privilege of resorting to all such legitimate changes as may be fairly embodied within the spirit and scope of the appended claims.

Having thus fully described my invention, what I desire to claim and secure by Letters Patent, is:—

1. The combination with a support, of a reservoir mounted for bodily vertical movement on the support and having a filling opening in one end accessible in the lowered position of the reservoir, means for retaining the reservoir in an elevated position upon the support, and additional means to seal the filling opening and preventing access thereto in the latter position of the reservoir.

2. The combination with the mud guard of a vehicle, of a reservoir approximately conforming to the longitudinal contour of said guard and having a filling opening, and means for mounting the reservoir upon the under side of the guard for limited vertical movement with respect thereto, whereby the reservoir may be moved into position to be filled.

3. The combination with a support, of a reservoir bodily movable upon the support and having a filling opening in one end unobstructed by the support when the reservoir is disposed in a lowered position thereon, means on the support for retaining said reservoir in an elevated position thereon, and additional means on the support adapted to project over said filling opening in the latter position of the reservoir and prevent access thereto.

4. The combination with the mud guard of a vehicle, of a reservoir approximately conforming to the longitudinal contour of said guard, means for mounting the reservoir upon the under side of the guard for limited vertical movement with respect thereto, and means for clamping the reservoir against the under side of the guard to hold the same against movement with respect thereto.

5. The combination with the mud guard of a vehicle, of a reservoir movably mounted beneath the top of the mud guard and extending longitudinally thereof, said reservoir having a filling opening in its forward end accessible in one position of the reservoir, and means for supporting the reservoir upon the mud guard against movement with respect thereto and in such position that the top wall of the guard extends over the filling opening whereby access to the latter is prevented.

6. The combination with the mud guard of a vehicle, of a reservoir approximately conforming to the longitudinal contour of said guard, means for mounting the reservoir upon the guard for vertical movement, said reservoir having a filling opening accessible in one position of the reservoir, and means for securing the reservoir in place against such vertical movement with respect to the guard, whereby the guard will prevent access to the filling opening.

7. The combination with the mud guard of a vehicle, of a reservoir mounted upon said guard for limited vertical movement with respect thereto, whereby the reservoir may be moved to position to be filled, and a clamping device on the guard to securely clamp the reservoir in position, whereby the guard will prevent access to the filling opening of the reservoir.

8. The combination with the mud guard of a vehicle, of a reservoir approximately conforming to the longitudinal contour of the guard, means for mounting the reservoir upon the guard for vertical movement with respect thereto, and a clamping bracket hingedly connected to the guard to securely clamp the reservoir upon the same against such vertical movement.

9. The combination with the mud guard of a vehicle, of a reservoir approximately conforming to the longitudinal contour of the guard, means for mounting the reservoir beneath the guard for vertical movement with respect thereto, and a clamping device hingedly connected to the guard and adapted to support the reservoir against the under side of the guard and prevent movement of the same with respect to the guard.

10. The combination with the mud guard of a motor vehicle having a depending flange, of a reservoir mounted upon said flange for limited vertical movement, and means connected to the flange to extend beneath the reservoir and clamp the same against the under side of the guard to secure the reservoir in place against movement with respect to said guard.

11. The combination with the mud guard of a motor vehicle having a depending flange, of a reservoir mounted upon said flange for limited vertical movement, said reservoir extending approximately the entire length of the guard, and a clamping bracket hingedly connected at one of its ends to the guard flange and adapted to extend beneath the reservoir to clampingly hold the same against the under side of the guard and prevent movement of said reservoir with respect to the guard.

12. The combination with the mud guard of a vehicle, of a reservoir mounted upon the under side of said guard and extending in advance of its forward end, the forward end of said reservoir being provided with a filling nozzle, and a cover plate hingedly mounted upon the guard and adapted to extend over said nozzle and be secured to the forward end of the reservoir.

13. The combination with a support, of a reservoir having limited bodily vertical movement upon the support and provided with a filling opening in one end accessible when the reservoir is lowered upon the support, means for clamping the reservoir in an elevated position upon the support and in contact with one wall thereof, and means mounted upon the support and adapted to be connected to the reservoir and extend over the filling opening whereby access to said opening is prevented.

14. The combination with a support, of a reservoir mounted for vertical movement on said support and provided with a filling nozzle at one end, and means mounted on the support adapted to be extended over said nozzle to cenceal the same and secured to the end of the reservoir to sustain said reservoir in one position against movement with respect to said support.

15. The combination with the mud guard of a vehicle, of reservoir means for mounting said reservoir upon the under side of said guard for vertical movement with respect thereto, and means mounted upon the mud guard adapted to be connected to the forward end of the reservoir when the reservoir is elevated into contact with the top wall of the guard.

16. The combination with the mud guard of a vehicle, of a reservoir mounted upon the under side of said guard for vertical movement and provided with a filling nozzle, means on the mud guard to support the reservoir in an elevated position in engagement with the top wall of the guard, and additional means mounted upon the mud guard adapted to be extended over the filling nozzle to conceal the same and secured to the reservoir to constitute supplementary supporting means.

In testimony whereof I hereunto affix my signature in the presence of two witnesses.

WALLACE J. HOTCHKISS.

Witnesses:
  M. A. MANWARING,
  D. W. LYBARGER.